United States Patent [19]

Aoyama

[11] Patent Number: 4,640,473

[45] Date of Patent: Feb. 3, 1987

[54] MAGNETIC TAPE CASSETTE WITH IMPROVED GUIDE ROLLER MEANS

[75] Inventor: Kazunori Aoyama, Kanagawa, Japan

[73] Assignee: Fuji Photo Film Co., Ltd., Kanagawa, Japan

[21] Appl. No.: 824,829

[22] Filed: Jan. 31, 1986

[30] Foreign Application Priority Data

Mar. 27, 1985 [JP] Japan .............................. 60-43076[U]

[51] Int. Cl.⁴ ...................... B65H 27/00; G11B 23/04
[52] U.S. Cl. .................................... 242/197; 242/76; 384/322
[58] Field of Search .................. 242/192, 197–200, 242/76, 55, 19 A; 226/189, 190, 193, 194; 360/132, 137; 384/241, 389–393, 322, 368, 371; 308/5 A, 5 R

[56] References Cited

U.S. PATENT DOCUMENTS

| | | | |
|---|---|---|---|
| 326,596 | 9/1885 | Senderling | 384/390 |
| 602,379 | 4/1898 | Titus et al. | 384/389 |
| 1,937,151 | 11/1933 | Jones | 384/369 |
| 3,848,265 | 11/1974 | Biery et al. | 360/132 |

*Primary Examiner*—John M. Jillions
*Attorney, Agent, or Firm*—Sughrue, Mion, Zinn, Macpeak and Seas

[57] ABSTRACT

A magnetic tape cassette is provided with an improved guide roller means. The magnetic tape cassette is of a type having an upper and lower half case with two hubs around which a magnetic tape is wound. Two guide rollers are rotatably mounted on a supporting shaft and are improved by providing each guide roller with a supporting annular seat which is protruded from one or both of the cassette half cases in such a manner as to surround the base end portion of the supporting shaft. Further, ribs with a height equal to or slightly smaller than the height of the annular seat, are disposed between the annular seat and the supporting shaft so as to connect the seat and the shaft.

12 Claims, 2 Drawing Figures

MAGNETIC TAPE CASSETTE WITH IMPROVED GUIDE ROLLER MEANS

BACKGROUND OF THE INVENTION

This invention relates to magnetic tape cassettes, and more particularly to an improvement of a so-called "Phillips" type magnetic tape cassette in which a magnetic tape is wound on a pair of hubs.

In general, in a magnetic tape cassette used for audio devices or the like, a pair of hubs on which a magnetic tape is wound are arranged in a cassette case made up of the upper and lower half cases. The magnetic tape is laid against right and left guide rollers arranged in the front part of the cassette so that the magnetic tape may be run through the front opening of the cassette.

Each of the guide rollers is rotatably provided in the cassette, and the magnetic tape is partially wound around each guide roller. Thus, when the guide rollers are rotated, one guide roller smoothly changes the direction of movement of the magnetic tape toward the recording and reproducing region in the front part of the cassette and the other guide roller smoothly changes the direction of movement of the magnetic tape toward the hub incorporating region. Accordingly, during a recording or reproducing operation, the tape running characteristic is greatly affected by the performance of rotation of the guide rollers. Especially in a magnetic tape cassette in which the guide rollers are rotatably mounted on guide roller supporting shafts which are extended from the lower half case, the performance of the guide rollers suffers from the following difficulty.

In general, in order to prevent the negative effects due to shrinkage which occurs in molding the half cases, an annular seat is formed in such a manner as to surround the base part of the supporting shaft. However, the lubrication between the upper end face of the seat and the roller end face is insufficient; therefore, the guide roller cannot turn smoothly, thus producing squeaks sometimes. If the guide roller is rotated for a long period under the condition which produces squeaks as described above, the aforementioned two end faces become worn. As a result, the guide roller is able to move up and down, which considerably decreases the smoothness of the tape running characteristic.

In the case where the above-described guide rollers are employed for a magnetic tape cassette, such as that operated in a digital system, which is higher in recording or reproducing density than a conventional audio magnetic tape cassette, the above-described difficulty is especially serious because the number of recording or reproducing tracks is large.

SUMMARY OF THE INVENTION

In view of the foregoing, an object of this invention is to provide a magnetic tape cassette which is so improved that the guide rollers thereof can smoothly rotate for a long period.

The foregoing object of the invention has been achieved by the provision of an improved guide roller means in a magnetic tape cassette having guide rollers which are brought into contact with a magnetic tape to guide the magnetic tape while the tape rotates. According to the invention, each of the guide rollers is rotatably mounted on a supporting shaft which is extended from one of the cassette half cases. One end face of each roller is supported by an annular seat which is protruded from the one cassette half case in such a manner as to surround the base end portion of the supporting shaft. In addition, at least one rib the height of which is equal to or slightly smaller than the height of the annular seat is provided between the annular seat and the supporting shaft in such a manner as to bridge the seat and the shaft.

BRIEF DESCRIPTION OF THE DRAWINGS

One preferred embodiment of this invention will be described with reference to the accompanying drawings. In the accompanying drawings.

DETAILED DESCRIPTION OF THE PREFERRED EMBODIMENT

Figure 1:
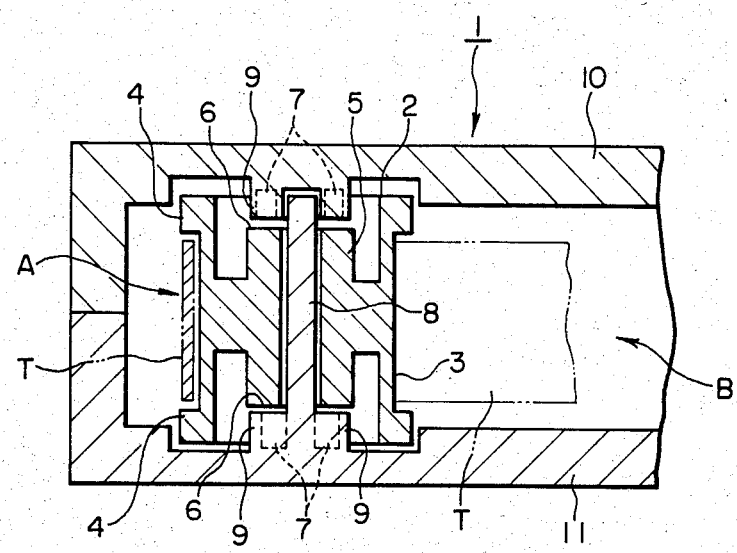
FIG. 1 is a cross-sectional view taken along the front-to-rear direction of one example of a magnetic tape cassette according to the invention which shows a part thereof in which a guide roller is arranged.

Similar to a conventional magnetic tape cassette, a magnetic tape cassette 1 shown in FIG. 1 is made up of upper and lower half cases 10 and 11, respectively. Furthermore, similar to a conventional magnetic tape cassette, recording and reproducing region A of the magnetic tape cassette 1 is closer to the front of the cassette 1 than are two guide rollers 2, and a hub incorporating region of the cassette 1 is closer to the rear of the cassette 1 than the guide rollers 2. The two guide rollers 2 are arranged on the right and left sides of the cassette case.

Each guide roller 2 is rotatably mounted on a supporting shaft 8 with roller end faces 6 of a boss 5 of the roller being supported by seats 9 which protrud from the upper and lower half cases 10 and 11, respectively, in such a manner as to surround the supporting shaft 8. Flanges 4 are formed at the upper and lower ends of the guide roller 2. The flanges 4 are larger in diameter than drum part 3 of the guide roller on which magnetic tape T is laid. The flanges 4 are used to limit the vertical movement of the magnetic tape T when the tape T is being run.

Figure 2:
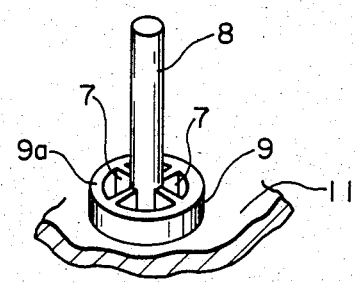
FIG. 2 is a perspective view of the part of the cassette where the guide roller shaft is arranged.

Four ribs 7 are provided between the supporting shaft 8 and each seat 9 in such a manner as to bridge the shaft 8 and seat 9. The inside ends of the ribs 7 are flush with the inside ends of the seats 9. As is apparent from FIG. 2, adjacent ribs 7 form an angle of 90°.

The seat 9 of the upper half case 10 into which the upper end portion of the supporting shaft 8 is inserted has the ribs 7 similarly disposed as in the case of the seat 9 of the lower half case 11. However, the ribs 7 may be eliminated from the seat 9 of the upper half case 10. For instance, the seat 9 of the upper half case 10 may be designed similar to a seat in a conventional magnetic tape cassette where the seat's width (that is, the distance between the inside and outside radii of the seat) is substantially equal to the thickness of the roller end face 6.

Similar to a conventional magnetic tape cassette, the upper and lower half cases 10 and 11, respectively, are made of ABS resin, PS resin, or the like. The guide rollers 2 are also made of a conventional plastic material such as polyacetal resin.

When the guide rollers 2 are set in the cassette case, in general, liquid-state lubricant such as silicone grease is applied to the supporting shafts 8 so that the guide rollers 2 can rotate smoothly. Accordingly, as the rollers 2 rotate, or with the lapse of time, the lubricant between the supporting shaft 8 and the boss 5 of the guide roller 2 flows down onto the upper end faces of the ribs 7 and the seat 9 of the half case set on the lower side. When the cassette is turned over, the lubricant spreads over the other seat 9.

As was described above, the ribs 7 serve to spread the lubricant applied to the supporting shaft 8 over the seat 9. That is, the ribs 7 cause the lubricant to spread over all the sliding surfaces of the guide rollers 2 and of the cassette case.

In the above-described embodiment, the upper end faces of the ribs 7 are flush with the upper end face of the seat 9; however, the invention is not limited thereby or thereto. That is, the height of the ribs 7 may be slightly smaller than that of the seat 9.

In the above-described embodiment, four ribs 7 are formed on each half case; however, the invention is not limited thereby or thereto. That is, only a minimum of one rib need be provided between the seat 9 and the supporting shaft 8.

As was described above, according to the invention, the lubricant applied to the supporting shaft 8 is spread to the seat 9 with the aid of the ribs 7. Thus, lubricant is spread over all the sliding surfaces of the guide rollers 2 and of the cassette case. Therefore, the roller end faces 6 and the seats 9 are less worn, and the sliding condition thereof is improved. Thus, according to the invention, it is possible to provide a magnetic tape cassette in which, unlike the conventional one, no squeaks are produced when the mating end faces of the guide rollers 2 and seats 9 slide on each other, and the rotational characteristic of the guide rollers 2 is improved.

What is claimed is:

1. A magnetic tape cassette having at least one guide means for contacting and guiding a magnetic tape while rotating, said guide means comprising:
    a shaft (8);
    a guide roller (2) rotatably mounted on said shaft, said guide roller have at least one axial end face (6);
    at least one annular seat (9) for supporting said end face of said guide roller; and
    at least one rib (7) integral with and extending radially inwardly between said seat and said shaft for conveying lubricant flowing downwardly between said shaft and said roller outwardly along said rib to said seat to reduce frictional resistance between the end face and the seat and to attendantly reduce wear.

2. A magnetic tape cassette according to claim 1, wherein said cassette includes cassette halves, and said annular seat is protruded from one of said cassette halves so as to surround a corresponding end portion of said shaft.

3. A magnetic tape cassette according to claim 1, wherein said rib has a height equal to or slightly smaller than the height of said annular seat.

4. A magnetic tape cassette according to claim 1, wherein said at least one rib comprises four ribs arranged at 90° intervals.

5. A magnetic tape cassette according to claim 1, wherein said cassette includes first and second cassette halves, and said shaft is protruded from said first cassette half.

6. A magnetic tape cassette according to claim 1, wherein said cassette includes first and second cassette halves, with said at least one annular seat including said rib provided on said first cassette half, and an annular seat having a width substantially equal to the thickness of said end face of said guide roller provided on said second cassette half.

7. A magnetic tape cassette of the type having a cassette casing, at least one guide roller (2) for contacting and guiding a magnetic tape while rotating and support means for rotatably supporting said guide roller, said support means comprising:
    a shaft (8) having a first end;
    an annular seat (9) formed on said cassette casing and surrounding one end of said shaft;
    said guide roller rotatably supported on said shaft and having an end face (6) supported by said annular seat; and
    at least one rib (7), extending radially between said shaft and annular seat, for distributing lubricant from said shaft to said annular seat.

8. A magnetic tape cassette according to claim 7, wherein said cassette casing comprises cassette halves each having an annular seat surrounding a respective end of said shaft and each having at least one rib extending radially between its annular seat and said shaft.

9. A magnetic tape cassette according to claim 7, wherein said rib has a height equal to or slightly smaller than the height of said annular seat.

10. A magnetic tape cassette according to claim 7, wherein said at least one rib comprises four ribs arranged at 90° intervals.

11. A magnetic tape cassette according to claim 7, wherein said cassette casing comprises cassette halves and said shaft is protruded from one of said cassette halves.

12. A magnetic tape cassette according to claim 7, wherein said cassette casing comprises cassette halves, and said annular seat and said rib are provided on one of said cassette halves, and a thick annular seat having a width substantially equal to the thickness of said end face of said guide roller is provided on the other of said cassette halves.

* * * * *